(12) United States Patent
Schultz et al.

(10) Patent No.: US 7,016,140 B1
(45) Date of Patent: Mar. 21, 2006

(54) TIMING MARK POSITION ERROR CORRECTION IN SELF-SERVO WRITE

(75) Inventors: Mark D. Schultz, Ossining, NY (US); Timothy J. Chainer, Putnam Valley, NY (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 10/990,913

(22) Filed: Nov. 16, 2004

(51) Int. Cl.
*G11B 21/10* (2006.01)

(52) U.S. Cl. ...................................... 360/75
(58) Field of Classification Search ............... None
See application file for complete search history.

(56) References Cited

U.S. PATENT DOCUMENTS

| | | | | |
|---|---|---|---|---|
| 4,511,938 | A * | 4/1985 | Betts ..................... | 360/77.08 |
| 5,600,506 | A | 2/1997 | Baum et al. | |
| 5,901,003 | A * | 5/1999 | Chainer et al. ........... | 360/75 |
| 6,075,668 | A * | 6/2000 | Chainer et al. ........... | 360/75 |
| 6,101,055 | A * | 8/2000 | Chainer et al. ........... | 360/51 |
| 6,172,830 | B1 * | 1/2001 | Leonard ................. | 360/75 |
| 6,252,732 | B1 * | 6/2001 | Chainer et al. ........... | 360/75 |
| 6,429,989 | B1 * | 8/2002 | Schultz et al. ........... | 360/77.08 |
| 6,433,950 | B1 * | 8/2002 | Liikanen ............... | 360/77.08 |
| 6,633,451 | B1 * | 10/2003 | Chainer et al. ........... | 360/75 |
| 6,654,196 | B1 * | 11/2003 | Yarmchuk ............... | 360/75 |
| 6,674,602 | B1 * | 1/2004 | Miles ................... | 360/75 |
| 6,735,031 | B1 | 5/2004 | Chainer et al. ........... | 360/75 X |
| 6,771,443 | B1 * | 8/2004 | Szita et al. ............. | 360/75 |
| 2004/0012874 | A1 * | 1/2004 | Chainer et al. ........... | 360/75 |
| 2005/0052769 | A1 * | 3/2005 | Yasuna et al. ........... | 360/75 |

OTHER PUBLICATIONS

U.S. Appl. No. 10/880,850, filed Jun. 30, 2004, Mark D. Schultz.

* cited by examiner

*Primary Examiner*—David Hudspeth
*Assistant Examiner*—James L Habermehl
(74) *Attorney, Agent, or Firm*—Townsend and Townsend and Crew LLP (57) ABSTRACT

Embodiments of the present invention provide a technique to correct timing mark position error in self-servo write (SSW). In one embodiment, a method of correcting a timing mark position error of a SSW pattern of a disk drive comprises writing a plurality of timing mark bursts over a plurality of steps on a disk, the plurality of timing mark bursts including at least one misaligned burst having an intentional misalignment in a first step with respect to a corresponding burst in a neighboring second step; reading the misaligned burst and the corresponding burst at a seam between the first step and the second step to obtain a measured burst amplitude; and using the measure burst amplitude to obtain a timing mark position error, which may involve comparing the measured burst amplitude and an expected burst amplitude computed based on the intentional misalignment between the misaligned burst and the corresponding burst to obtain a timing mark position error.

30 Claims, 9 Drawing Sheets

TIMING MARK POSITION ERROR CORRECTION IN SELF-SERVO WRITE

CROSS-REFERENCES TO RELATED APPLICATIONS

This application is related to commonly assigned U.S. patent application Ser. No. 10/880,850, filed on Jun. 30, 2004, the entire disclosure of which is incorporated herein by reference.

BACKGROUND OF THE INVENTION

This invention relates to disk drives and, more particularly, to a system and method for removing the periodic component of the timing mark position error of a self-servo write (SSW) pattern.

Figure 1:
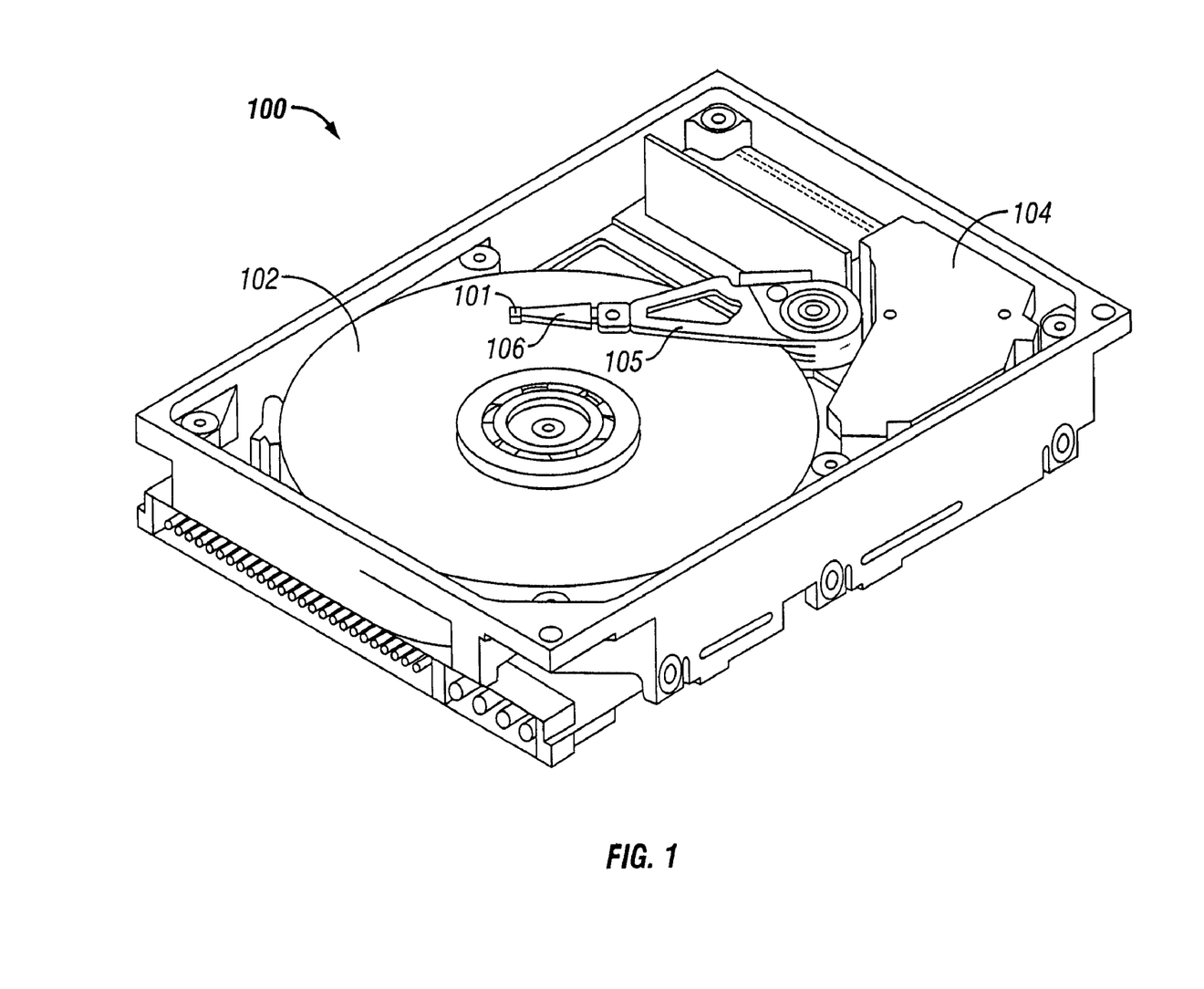
FIG. 1 is a perspective view of an exemplary hard disk drive (HDD) which may implement the techniques of the present invention.

FIG. 1 shows an exemplary hard disk drive (HDD) 100 having a recording slider that includes, for example, an offset head 101, that is positioned over a selected track on a magnetic disk 102 using a servo system for writing data to and/or reading data from the disk 102. Data is recorded in arrays of concentric data information tracks on the surface of the disk 102. While HDD 100 shows only a single magnetic disk 102, HDDs typically have a plurality of stacked, commonly rotated rigid magnetic disks. The servo system of the HDD 100 can include an actuator 105, a voice coil motor (VCM) 104 for coarse positioning a read/write head suspension 106, and a secondary actuator, such as microactuator or micropositioner, for fine positioning the read/write head 101 over a selected track. As used herein a microactuator (or a micropositioner) is a small actuator that is placed between a suspension and a slider and moves the slider relative to the suspension.

Conventional self-servo writing of a hard disk drive is basically performed one track at a time from the inner diameter (ID) to the outer diameter (OD) of a magnetic recording disk, using a spindle motor index and information from previously written nearby tracks. The magneto-resistive (MR) read sensor and the write element of an offset head are not on the same radius, particularly toward the OD of the disk. Accordingly, the offset between the read sensor and the write element changes with respect to tracks on the disk as the skew angle of the armature changes. For example, near the ID of the disk, the offset between the read sensor and the write element typically is a distance of about eight tracks. At the OD of the disk, the offset between the read sensor and the write element typically is a distance of about 40 tracks.

Ideally, a self-servo pattern should be a line nominally following the arc of motion of the head from the ID to the OD of the disk, but because self-servo writing is basically performed by writing the servo pattern one track at a time and because of the offset between the read sensor and the write element, errors propagate through the servo pattern that cause the servo pattern to be warped away from the desired trajectory, which is nominally straight locally. One error pattern that propagates through the self-servo pattern from the ID to the OD of a disk has a period that is related to the offset distance between the read sensor and the write element. To further complicate matters, the periodic error pattern changes as the skew angle of the armature changes. Thus, the warp can become large enough to cause a low-amplitude misalignment or missed windows during a high-speed seek.

U.S. patent application Ser. No. 10/880,850 addresses a similar problem as in the present application, including the warps or shifts in the circumferential direction of the propagated self-servo writing (SSW) timing and/or index marks. This reference discloses determining the periodic component of a timing mark position error of a SSW pattern on a disk based on measurements made of the timing mark position error at selected radial track locations, and removing the determined periodic component of the timing mark position error based on the radial location on the disk. The timing mark position errors of first and second selected radial track locations of a disk are measured. The periodic component of the timing mark position error of the self-servo write pattern is determined based on the timing mark position error of the first selected radial track location and the timing mark position error of the second selected radial track position. The period of the periodic component of the timing mark position error is based on the offset between the read sensor and the write element of the read/write head, and the maximum value of the periodic component of the timing mark position error is based on half of the offset between the read sensor and the write element of the read/write head.

Figure 2:
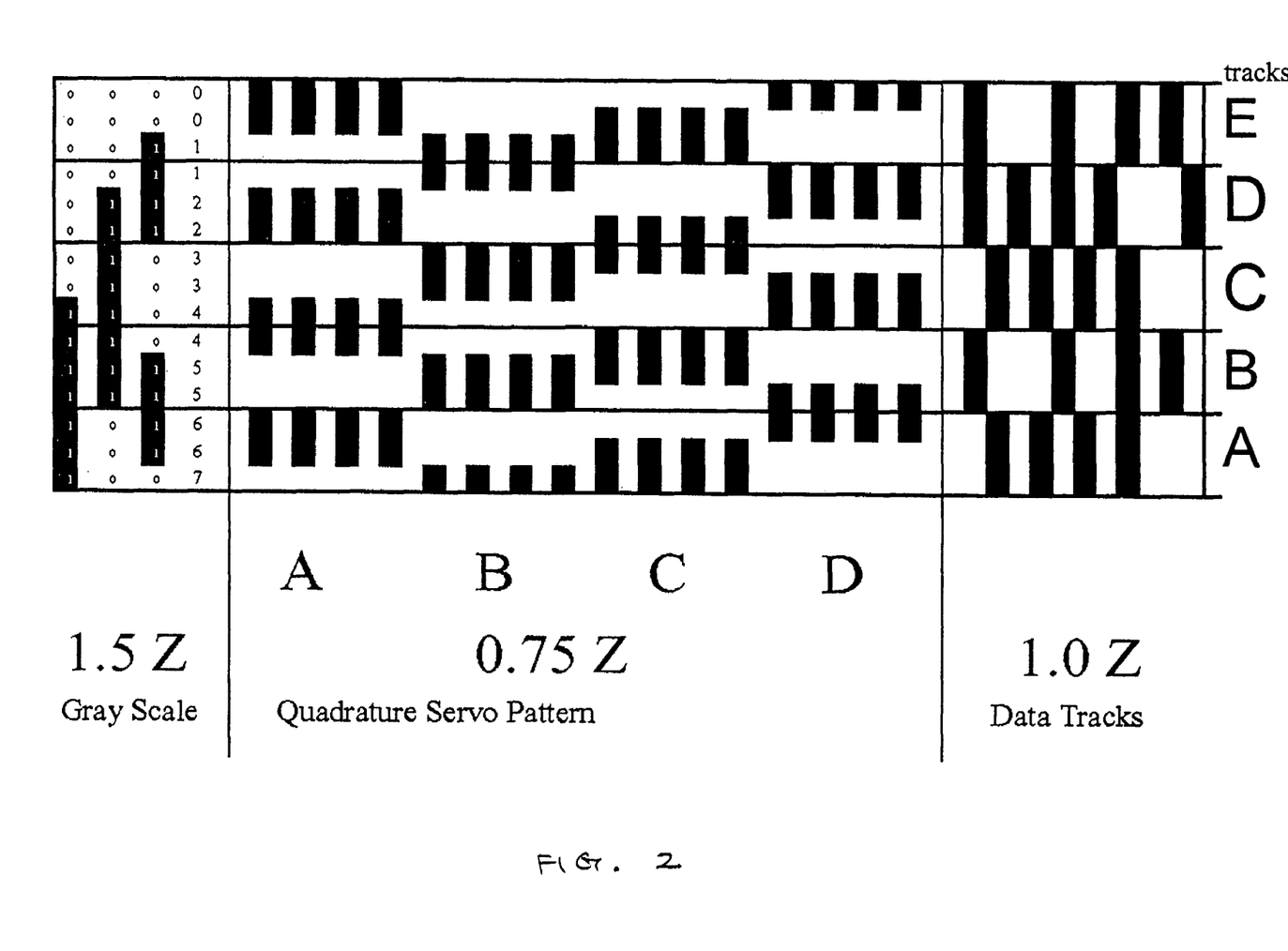
FIG. 2 is a diagram showing data tracks, quadrature servo pattern, and gray scale on a disk in which position error signal (PES) bursts are used to determine radial position of the head over disk.

In some prior methods, position error signal (PES) bursts are used to determine the location of the head over disk in the radial direction. The goal is to position the read or write head over the correct data track. All PES bursts are written at the same frequency and phase. In U.S. Pat. No. 5,600,506, two servo bursts are used to get a read or write head over a desired data track. Each data track has a boundary defined by two servo bursts. The data track comprises a gray scale band located in the preamble area of each sector. Each gray scale is divided into two zones. By using a predetermined set of rules regarding the gray scale area address and zone number, any correct radial location between the OD and the ID on a disk can be identified. FIG. 2 shows an example of using PES bursts to determine the location of the head over disk in the radial direction.

Another approach utilizes timing marks based on straight line propagation in the radial direction. In U.S. Pat. No. 6,735,031, previously written timing marks are retrieved to calculate the proper radial location for writing new timing marks. By using the write width, the read to write offset, the read width of the head, and the servo radial step distance in comparison to a timing mark, the radial propagation steps and fractional amount of the read head that lies over part of the timing mark line can be found. Based on a mathematical calculation, future timing marks can be estimated to be written in straight radial lines propagating from the ID to the OD of a disk.

In short, SSW timing propagations can develop warps at a period equal to the head offset, and the warps generally decay due to the effects of read head overlap. This decay can be compromised for narrow read heads and possibly by the normal systematic delay control loop, resulting in persistent warps which can be large enough to cause misalignment (low amplitude) or missed windows during high speed seek. Conventional solutions to the problem are vulnerable to large index noise and are limited in the future by the current levels of index noise. The normally used systematic delay control loop referenced to index is similarly (although less so) vulnerable to the future characteristics of the index noise. Large index noise decreases the ability to accurately determine the self-servowrite warps at a period equal to the head offset.

BRIEF SUMMARY OF THE INVENTION

Embodiments of the present invention provide a technique to correct timing mark position error in self-servo write (SSW). In specific embodiments, the technique is used to determine and remove the periodic component of the timing mark position error of an SSW pattern. Instead of or in addition to measuring pattern location relative to index (the angular position of a disk with respect to the servo mechanism as determined by the servo pattern mark indicating the start of a sector), a direct measurement of step-to-step misalignment is used. In some embodiments, a direct measurement of step-to-step misalignment includes purposefully misaligned bursts (e.g., by 90 degrees out of phase) written at each step or track. The amplitude at the seam between adjacent steps is measured. Such a misalignment measurement provides an estimate of the actual misalignment on a single step (and single sector) basis. This provides a more accurate measurement of the warp and can conceivably provide information useable to control to some degree the overall systematic delay. In specific embodiments, the technique can be used to measure the periodic component of the timing mark position error of the SSW pattern, and to correct the periodic position error to remove it from the systematic error component over the entire revolution of the disk.

An aspect of the present invention is directed to a method of correcting a timing mark position error of a self-servo write pattern of a disk drive. The method comprises writing a plurality of timing mark bursts over a plurality of steps on a disk, the plurality of timing mark bursts including at least one misaligned burst having an intentional misalignment in a first step with respect to a corresponding burst in a neighboring second step; reading the misaligned burst and the corresponding burst at a seam between the first step and the second step to obtain a measured burst amplitude; and using the measured burst amplitude to obtain a timing mark position error.

In some embodiments, writing the plurality of timing mark bursts comprises writing three consecutive timing mark bursts including a first burst, a second burst next to the first burst, and a third burst next to the second burst in each step. The first burst has an intentional misalignment, the second burst having no intentional misalignment, and the third burst having another intentional misalignment. The timing mark position error is a difference between the measured burst amplitude of the first burst and the measured burst amplitude of the third burst. Alternatively, the timing mark position error is the difference between the measured burst amplitude of the first burst and the measured burst amplitude of the third burst, normalized by the measured burst amplitude of the second burst. The intentional misalignment of the first burst and the intentional misalignment of the third burst are opposite in sign and approximately equal in magnitude. The intentional misalignment of the first burst may comprise a phase shift of about +90° and the intentional misalignment of the third burst may comprise a phase shift of about −90°.

In specific embodiments, reading the misaligned burst and the corresponding burst at a seam between the first step and the second step comprises positioning a read head to be approximately centered with respect to the first step and the second step. The method further comprises forming an array of depth equal to a read-to-write offset for tracking the timing mark position error at modulo the read-to-write offset, feeding back a portion of the timing mark position error to a controller of a write head at each step according to the step's position within the array, selecting gains to optimize control by the controller without adding excessive measurement noise, and writing subsequent timing mark bursts corrected based on the timing mark position error fed back to the controller. The method may be used to correct periodic timing mark position error in subsequent timing mark writing on the disk.

In some embodiments, using the measure burst amplitude to obtain a timing mark position error comprises comparing the measured burst amplitude and an expected burst amplitude computed based on the intentional misalignment between the misaligned burst and the corresponding burst to obtain the timing mark position error. Writing the plurality of timing mark bursts may comprise writing a first burst and a second burst in each step, the first burst having an intentional misalignment, the second burst having another intentional misalignment. In that case, the timing mark position error is a difference between the measured burst amplitude of the first burst and the measured burst amplitude of the second burst.

Another aspect of the invention relates to a method for self-servo writing on the disk with correction based on the timing mark position error. Another aspect is directed to a disk having a self-servo write pattern written thereon according to the above method. Yet another aspect is directed to a rotating disk storage device comprising at least one such disk; a head configured to read from and write to the at least one disk; and an actuator connected to the head to move the head relative to the at least one disk.

In accordance with another aspect of the present invention, a servo writing apparatus for writing a self-servo write pattern of a disk drive comprises a read/write head configured to read from and write to a disk; and a controller having a computer readable storage medium to store a program. The program comprises code for writing a plurality of timing mark bursts over a plurality of steps on a disk, the plurality of timing mark bursts including at least one misaligned burst having an intentional misalignment in a first step with respect to a corresponding burst in a neighboring second step; code for reading the misaligned burst and the corresponding burst at a seam between the first step and the second step to obtain a measured burst amplitude; and code for comparing the measured burst amplitude and an expected burst amplitude computed based on the intentional misalignment between the misaligned burst and the corresponding burst to obtain a timing mark position error.

DETAILED DESCRIPTION OF THE INVENTION

Embodiments of the present invention provide a technique to solve the problem of warps/shifts in the circumferential direction of propagated self-servo writing (SSW) timing and/or index marks. The technique also generally improves self-servo writing/propagation quality. In addition, the present technique provides a way of determining small slippage to the right or left along a circumferential direction on a hard disk drive.

Timing burst misalignment can be detected by measuring the burst amplitude at a point where the read element overlaps the bursts written on two consecutive steps or tracks, ideally overlapping so that half the signal comes from each of the bursts written on the consecutive steps. If the original neighboring bursts are written at nominally the same phase, small misalignments produce little change in amplitude, with no information on the polarity of the error. If, however, the neighboring bursts are written at a nominal target out-of-phase position, the amplitude changes due to unintended misalignment will be relatively large and polarity sensitive. If the second burst is late relative to nominal, the amplitude change at the overlap read position will be opposite in sign to the amplitude change if the second burst is early relative to nominal.

Figure 3:
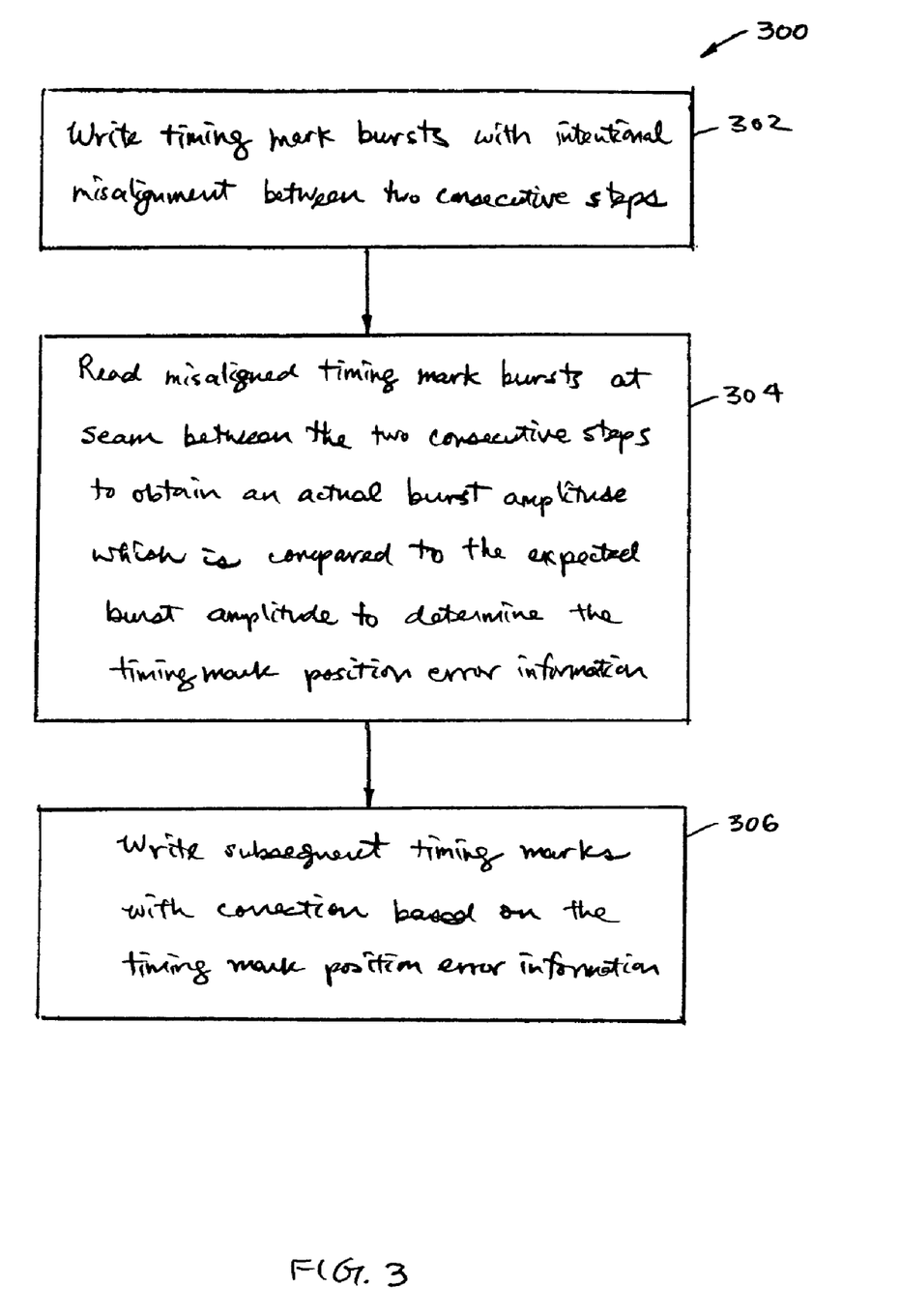
FIG. 3 is a flow diagram of an error detection and correction method for self-servo writing (SSW) according to an embodiment of the present invention.

According to an exemplary embodiment of the invention as illustrated in the flow diagram 300 of FIG. 3, a method of correcting timing mark position error includes, at step 302, writing a plurality of timing mark bursts with at least one intentional misalignment of bursts between two consecutive or neighboring steps or tracks. The method utilizes offset in the form of phase shifts of amplitude bursts. In step 304, the misaligned or offset bursts are read at the seam to obtain an actual burst amplitude which is compared to the expected burst amplitude from the offset to obtain timing mark position error information. It is desirable, though not necessary, that about half the signal comes from each of the misaligned bursts written on the consecutive steps. To do so, the read head is ideally centered over the seam between the two consecutive steps or tracks. The offset between the two neighboring bursts may be written at any nominal target out-of-phase level, and is selected to produce an amplitude changes due to unintended misalignment that will be relatively large and polarity sensitive. In one preferred embodiment, the offset in the form of phase shift is about +90° or −90°. In step 306, the error information based on the actual and expected burst amplitudes is used to correct the writing of subsequent timing marks to reduce or eliminate unintended misalignment. It is noted that an error signal of the proper sign (if not the exact magnitude) will be generated even if the read head is not quite centered over the seam.

Figure 4:
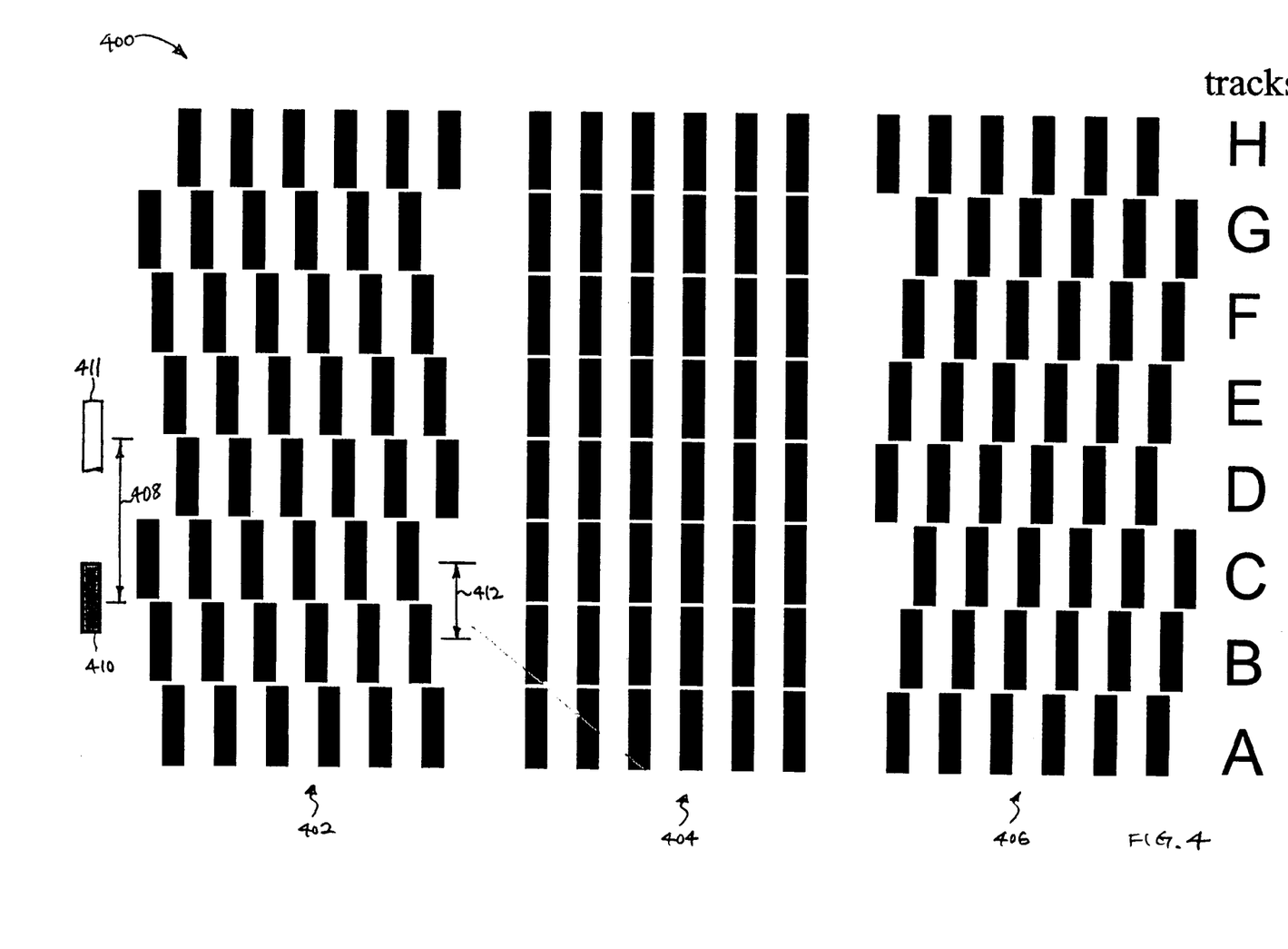
FIG. 4 is a diagram of a timing error detection pattern with no errors in one example.

The specific embodiment of a SSW pattern 400 as illustrated in FIG. 4 employing three consecutive bursts in each step or track. The use of multiple bursts instead of a single burst may produce better error correction because more error information can be gathered and used. As seen in FIG. 4, the left burst 402 has an intentional misalignment, the center burst 404 has zero intentional misalignment, and the right burst 406 has another intentional misalignment. In the example shown, the odd bursts 402, 406 each have nonzero phase shifts, while the even burst 404 has a zero phase shift. FIG. 4 shows an intentional phase shift of −90° for the left burst 402 and an intentional phase shift of +90° for the right burst 406. This scheme is used for each step or track of the SSW pattern 400. The read head 410 is shown at the seam between track B and track C at a particular point in time. The error term is the difference between the amplitude of the left and right (or first and third) bursts 402, 406, which may optionally be normalized by the amplitude of the center (or second) burst 404. When the write head is positioned as illustrated in FIG. 4, the amplitude of the first burst 402 will be equal to the amplitude of the third burst 406, and will be equal to about 65% of the amplitude of the second burst 404 if there is no erase seam. As such, the SSW patterns are aligned since the first and third amplitudes are equal and the phase shifts are opposite for the first burst 402 and the third burst 406.

Figure 5:
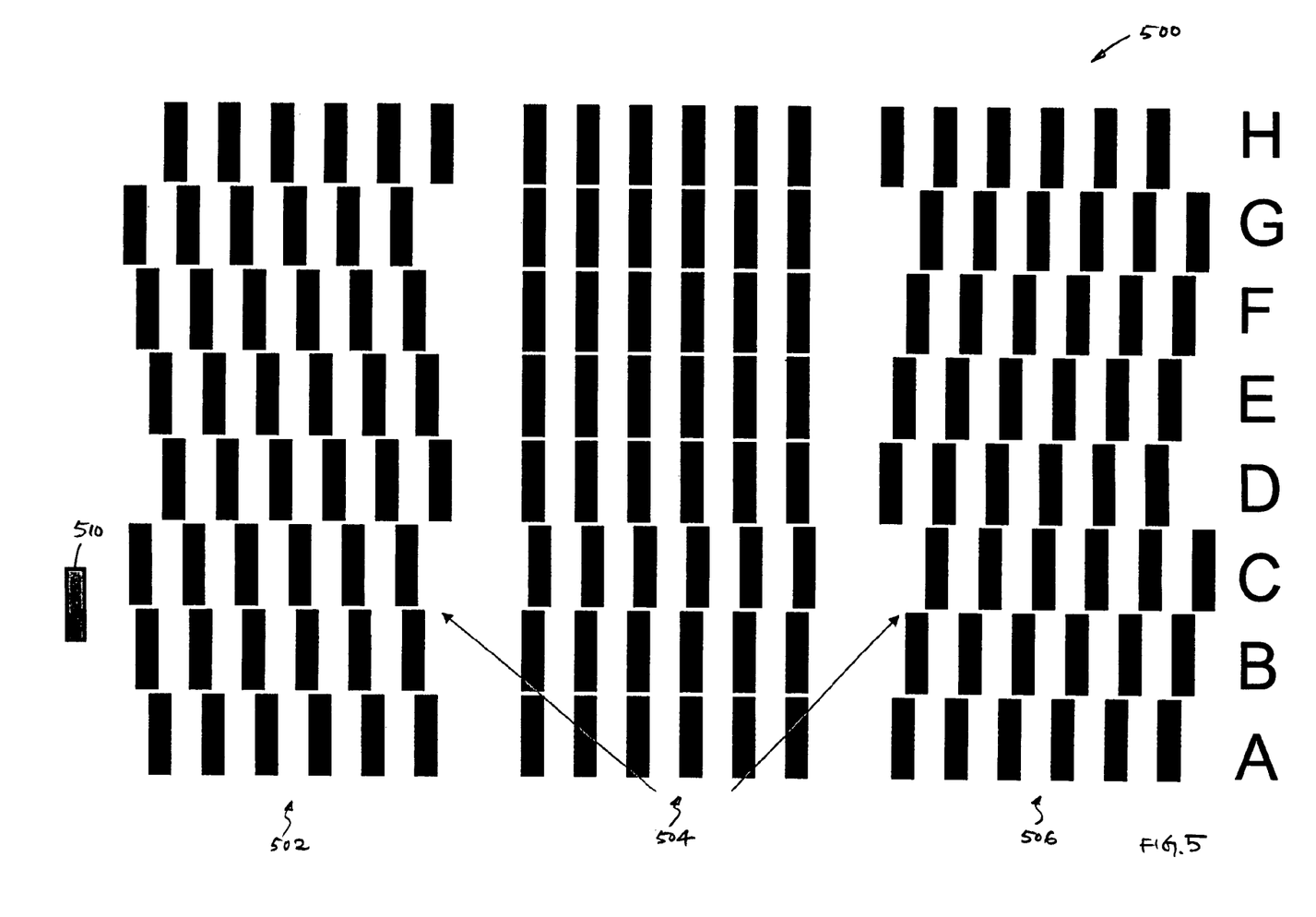
FIG. 5 is a diagram of a timing error detection pattern with a single track error in another example.

FIG. 5 shows what happens if one track (track C) is written later than it is supposed to be written. As shown, the read head 510 is positioned at the seam between track B and track C. At the seam between track B and track C, the first burst 502 has more overlap and the third burst 506 has less overlap due to the time slip. In this SSW pattern 500, the first burst 502 will have a higher amplitude than the third burst 506, while the second burst 504 will have a relatively slight change in amplitude from the aligned position due to the small alignment change. The difference in amplitude between the first burst 502 and the third burst 506 acts as a basic error signal. This error can optionally be normalized by the amplitude of the second burst 504.

Figure 6:
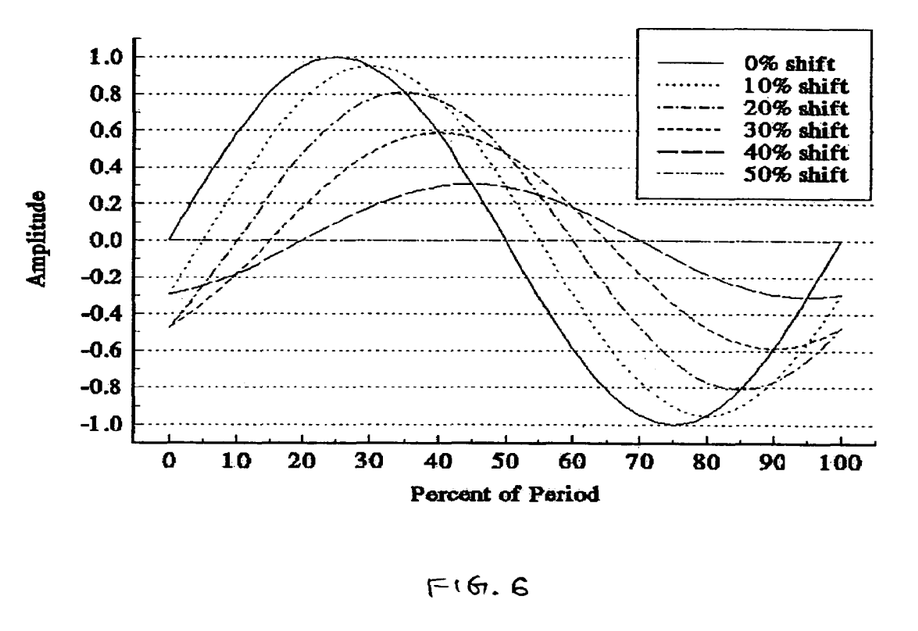
FIG. 6 is a chart showing amplitude versus relative phase between two adjacent bursts.

FIG. 6 shows how the amplitude changes with misalignment for the bursts. For less than 10% misalignment (i.e., 36° phase shift), there is very little amplitude drop (about 5%). At 25% misalignment (i.e., 90° phase shift), the amplitude drop is about 30%). The drop in amplitude is significant from about 0.7 times to about 0.45 times the original amplitude when the misalignment changes from 25% to 35%, which represents an amplitude drop of about 25% (from 0.7 to 0.45) as a result of a 10% increase in misalignment (from 25% to 35%). The selection of an intentional phase shift of 90% is desirable because it provides a usable amplitude corresponding to a sufficiently large magnitude in phase shift. As discussed above, however, an intentional phase shift of a different magnitude can be used in other embodiments.

Based on the results of the read head at each seam between neighboring steps or tracks, an array of depth N elements where N is the integer part of the read to write offset 408 between the read head 410 and the write head 411 in units of servo track steps which is calculated by dividing the read to write offset by the servo track pitch 412 and dropping the remainder of the division, as seen in FIG. 4. The read-to-write offset is the radial displacement between the read sensor and the write element (which will gradually change as offset changes) and is measured to track the alignment error at modulo the read-to-write offset. Some fraction of this error will be fed back at each step or track according to the step's position within the array. Gains will be chosen to optimize control without adding excessive measurement noise. The raw measurement will be the amplitude error term described above. Unlike the prior method using the index measurement, the amplitude measurement is a step-to-step differential term. The mathematical manipulation of the data for error correction can be either similar to or somewhat different from what is used in the prior method, as described below. If warp correction is the only desired result, the sum of the differential errors over the offset period should still be zero or substantially equal to zero.

Figure 7:
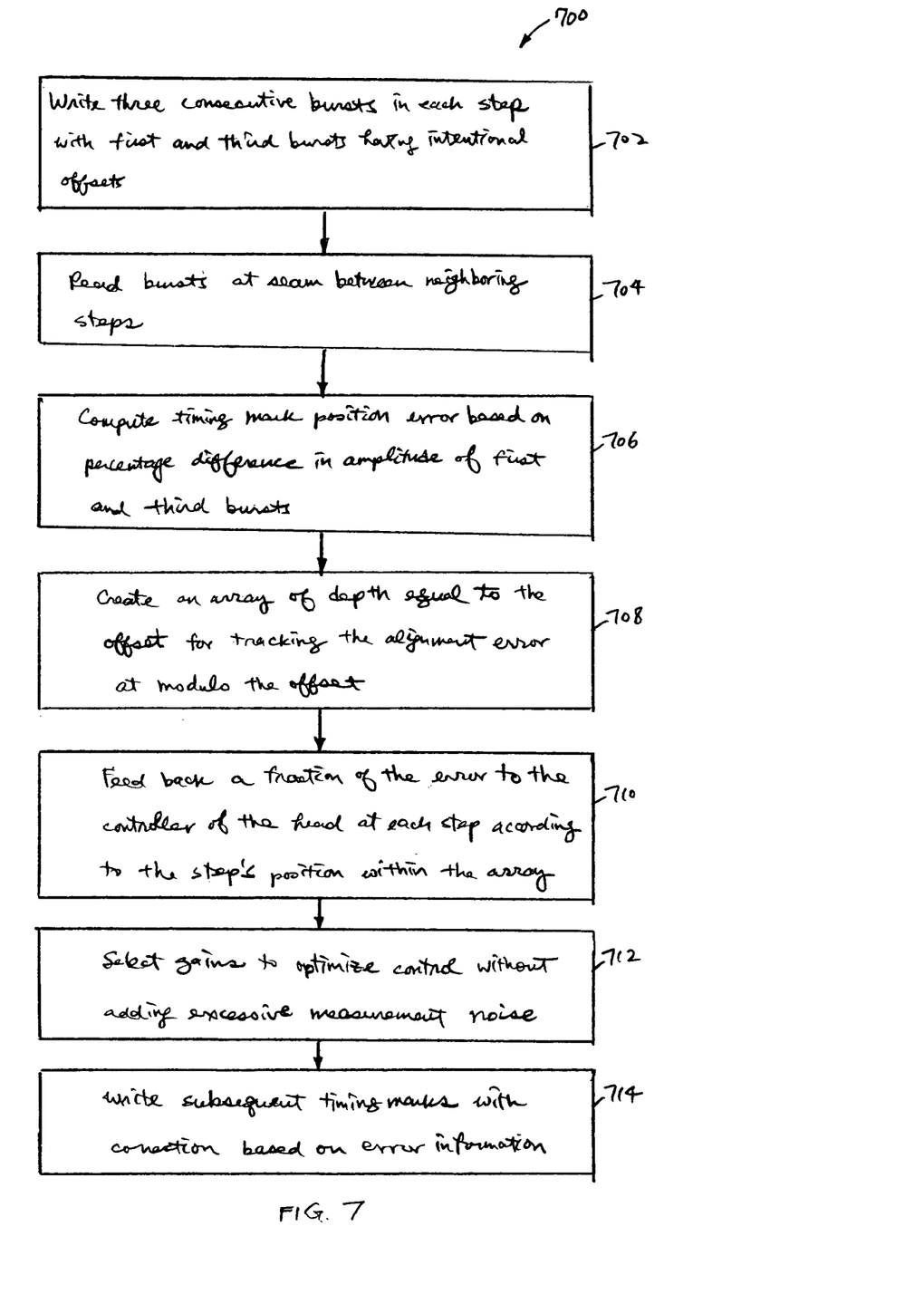
FIG. 7 is a flow diagram of an error detection and correction method for SSW employing three consecutive bursts according to another embodiment of the present invention.

FIG. 7 shows a flow diagram 700 of the specific embodiment of the error detection method as described. In step 702, three consecutive bursts are written in each step or track, preferably in a sector where the read head is centered or nearly centered over the seam between neighboring steps. The first and third bursts are written with intentional misalignments, while the second burst is written without any intentional misalignment. The offset bursts are read by the read head at the seam between neighboring steps or tracks (step 704). This involves direct measurement of the amplitude to obtain a step-to-step misalignment in differential term. In step 706, the timing mark position error is computed based on the percentage difference in amplitude of the first and third bursts, optionally normalized by the amplitude of the second burst. In step 708, an array of depth equal to the read-to-write offset as previously described is created for tracking the alignment error at modulo the read-to-write offset. An array of estimated error terms based on the read information indexed by the offset number of elements in the array is stored. In step 710, a fraction of the error is fed back to the controller of the head at each step according to the step's position within the array. In one embodiment the fraction may be ½. Gains are selected to optimize control without adding excessive measurement noise (step 712). In step 714, subsequent timing marks are written with correction to reduce or eliminate unintended misalignment based on the error information.

The error detection method can be used to measure and correct burst alignment. Given that the read head should be nearly centered over the seam of neighboring steps or tracks, one likely use of the method is to detect and correct misalignment errors which occur over the entire revolution of a disk as such "full rev" misalignments which are periodic with offset can be difficult to detect. In this case, the sectors during the step when the read head is nearly centered over the seam can be chosen as the measurement sectors.

Figure 8:
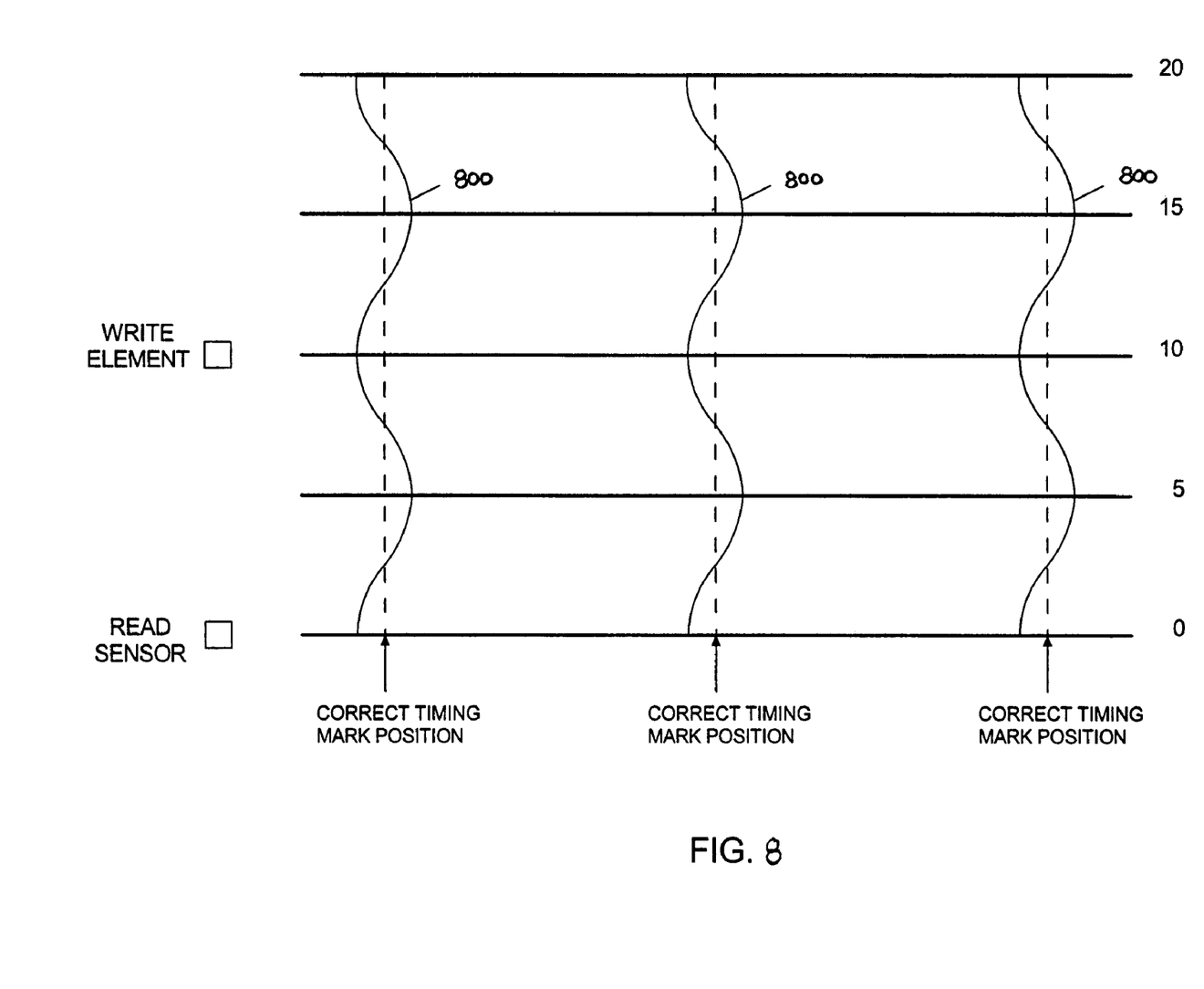
FIG. 8 is an exemplary sinusoidal periodic position error pattern with respect to tracks on a portion of a disk and with respect to the correct timing mark position.

The pattern of the periodic position error is sinusoidal and exhibits zero error at one radial location, advances on a track-by-track basis to a maximum error, then returns on a track-by-track base to a zero error at another radial location. For example, FIG. 8 depicts an exemplary sinusoidal periodic position error pattern 800 with respect to tracks on a portion of a disk and with respect to the correct timing mark position. In FIG. 8, the offset between the read sensor and the write element is ten tracks. Periodic position error 800 exhibits zero error at tracks 2.5 and 7.5, and exhibits a maximum error at track 5. The periodic nature of the error repeats by exhibiting another maximum error at track 15, a zero error at track 20, a maximum error at track 25, etc. Thus, for a head having a read sensor/write element offset of ten tracks at the disc radius depicted in FIG. 8, track positions 13, 23, 33, 43, etc., are modulo the read-to-write offset (i.e., 3); track positions 15, 25, 35, 45, etc., are modulo the offset (i.e., 5).

The spindle motor index mark, which is used during the self-servo write process, has a 1-sigma noise error of about 20 ns. Accordingly, the small track-to-track differences exhibited by the periodic position error pattern cannot be accurately measured on a track-by-track basis. The present invention provides an embodiment for determining and removing the periodic position error pattern. Although not absolutely necessary, the sum of the error of the track offsets can be set to zero to correct for the periodic error. The future timing marks written based on correction for the periodic error can slowly correct the burst misalignment and remove the periodic position error pattern.

Figure 9:
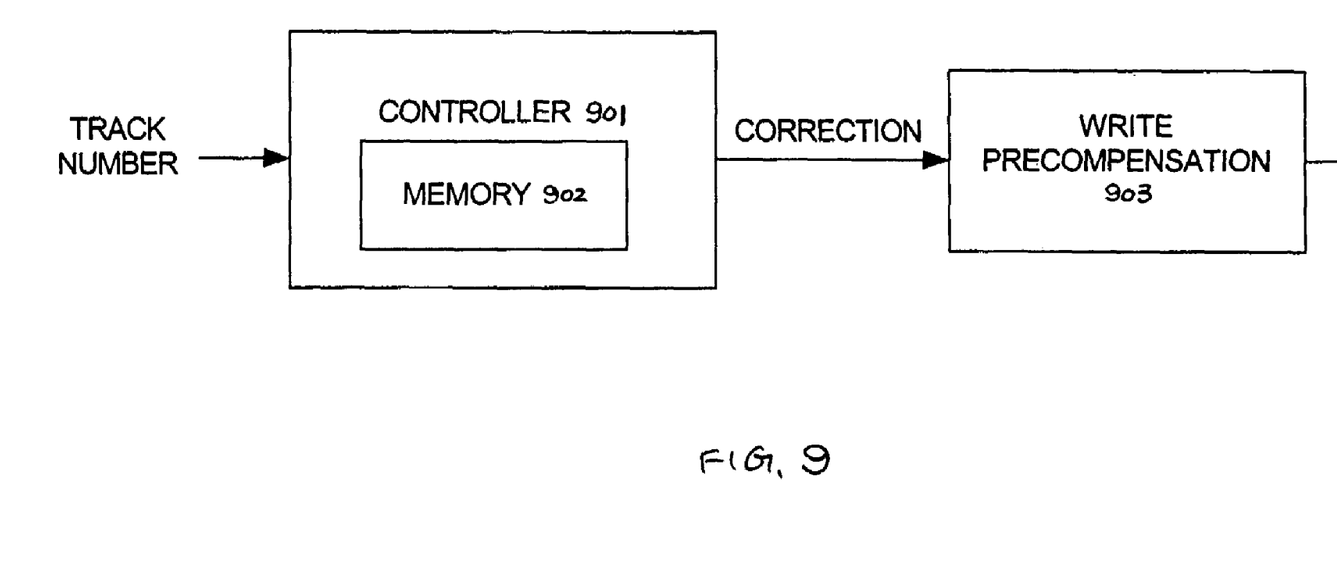
FIG. 9 is a functional block diagram of a disk controller having a memory containing an array according to an embodiment of the present invention.

To illustrate removal of the periodic position error, consider an array Repamperror[N] in which N is the integer part of, or closest integer to, the largest expected value of the offset in units of servo track steps. FIG. 9 depicts a functional block diagram of a disk controller 901 having a memory 902 containing values corresponding to the periodic timing mark error for each radial track location. The variable Nc would be the current integer part of or closest integer to the current offset. An offset index (repindex) would be used that starts at zero and for each track step increments to Nc−1. When Nc−1 is reached, the next value of repindex would be zero. The looping of repindex from zero to Nc−1 continues through the warp propagation. The value of Repamperror [repindex] is adjusted at each track step by a portion (e.g., one tenth or another value) of the difference between the current value and the current amplitude error measurement. In order to avoid interaction with the normal systematic delay loop, the average of all values of Repamperror[i] is computed and subtracted from each value of Repamperror[i] before being used to correct subsequent timing mark writes. The computation to generate the average could be done once for each Nc steps. Some gain factor (e.g., 0.1) times the value of Repamperror [i] will be added to the systematic delay term at each step through write precompensator 903 (FIG. 9), correcting any warp that has been created. It should also be noted that an alternative approach is a Fourier-lysis type analysis of the amplitude terms. Those terms associated with the current offset could be used to correct for the errors at those offset frequencies. However, the previously described step domain solution is likely easier to implement.

To further illustrate the present invention, the following pseudo-code implements one embodiment of the present invention.

```
{
    warpcorrect[warpindex]-=warpavg;
    warpfix=warpcorrect[warpindex]*warpgain;
    warpcorrect[warpindex]+=(warperr-warpcorrect[warpindex])*warpweight;
    warpsum+=warpcollect[warpindex];
    if(++warpindex>=stepint)
    {
        warpavg=warpsum/stepint;
        warpsum=0.0;
        warpindex=0'
    }
}
oneshot=oneshot0+halfcorrect+warpfix;
```

The variable "stepint" would be the current integer portion of the read/write offset in servo steps. The variable "oneshot" is the systematic delay value. The variable "halfcorrect" is the normal systematic delay loop term. Lastly, the variable "warperr" is the current measurement amplitude. The equations illustrated by the above pseudo-code have been implemented for the index measurement and found to be effective in actual use. They are believed to work similarly for the amplitude measurement case. A typical value for warpweight would be 0.1. Similarly, a typical value for warpgain would be 0.1.

An alternative embodiment includes some integral or other type of feedback structure. If stepint gets larger, the new active element(s) in the array should be assigned a value of zero until the slope at the new value can be determined. While the equations above would likely work because the input measurement is a differential one, an integral over the offset based error term may be a better approach. The following pseudo-code implements another embodiment for this type of approach of the present invention. Similar values of warpgain and warpweight could be used.

```
{
    warpcorrect[warpindex]-=warpavg;
    warpfix=warpcorrect[warpindex]*warpgain;
    warperrint+=(warperrm[warpindex]-warperravg);
    warperrm[warpindex]=warperr;
    warperrsum+=warperr;
    warpcorrect[warpindex]+=(warperrint-warpcorrect[warpindex]*
    warpweight;
    warpsum+=warpcorrect[warpindex];
    if(++warpindex>=stepint)
    {
        warpavg=warpsum/stepint;
        warperravg=warpsum/stepint;
        warpsum=0.0;
        warperrsum=0.0;
        warperrint=0.0;
        warpindex=0;
    }
}
oneshot=oneshot+halfcorrect+warpfix;
```

The average value of the amplitude measurement over all neighboring steps could also be used as an overall systematic delay error term. However, the head geometry and erase band characteristics make it difficult to impossible to use this as the only reference for systematic delay error. Some reference to a fixed position signal (index) would likely still be necessary, although at a much lower gain.

The described measurements are ideally taken near where the read head is overlapping the seam between writes, perhaps during the step. However, the three burst scheme above reduces the error due to being off center compared with a single burst solution. Further, small timing and phase shift errors from relative magnitudes of position error signal read at the seam between two consecutive/concentric tracks can be detected. Use of in-step data essentially assumes that the within rev sector control is good enough. If not, it will be beneficial to take this measurement for an entire rev at the overlap point (for very poor coupling cases such as one involving very narrow read widths). The present approach is superior in that it is a much quieter measurement of the error. Based on the error, the write operation can be corrected to improve the SSW pattern propagation to achieve a more accurate placement of the servo pattern on a new blank disk, and to reduce or eliminate warps or shifts in the circumferential direction of the propagated SSW timing and/or index marks.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A method of correcting a timing mark position error of a self-servo write pattern of a disk drive, the method comprising:

writing a plurality of timing mark bursts over a plurality of steps on a disk, the plurality of timing mark bursts including at least one misaligned burst having an intentional misalignment in a first step with respect to a corresponding burst in a neighboring second step;

reading the misaligned burst and the corresponding burst at a seam between the first step and the second step to obtain a measured burst amplitude; and using the measured burst amplitude to obtain a timing mark position error.

2. The method of claim 1 wherein writing the plurality of timing mark bursts comprises writing three timing mark bursts including a first burst, a second burst next to the first burst, and a third burst next to the second burst in each step, the first burst having an intentional misalignment, the second burst having no intentional misalignment, and the third burst having another intentional misalignment.

3. The method of claim 2 wherein the timing mark position error is a difference between the measured burst amplitude of the first burst and the measured burst amplitude of the third burst.

4. The method of claim 3 wherein the timing mark position error is the difference between the measured burst amplitude of the first burst and the measured burst amplitude of the third burst, normalized by the measured burst amplitude of the second burst.

5. The method of claim 2 wherein the intentional misalignment of the first burst and the intentional misalignment of the third burst are opposite in sign and approximately equal in magnitude.

6. The method of claim 5 wherein the intentional misalignment of the first burst comprises a phase shift of about +90° and the intentional misalignment of the third burst comprises a phase shift of about −90°.

7. The method of claim 1 wherein reading the misaligned burst and the corresponding burst at a seam between the first step and the second step comprises positioning a read head to be approximately centered with respect to the first step and the second step.

8. The method of claim 1 further comprising forming an array of depth equal to a read-to-write offset for tracking the timing mark position error at modulo the read-to-write offset.

9. The method of claim 8 further comprising feeding back a portion of the timing mark position error to a controller of a write head at each step according to the step's position within the array.

10. The method of claim 9 further comprising writing subsequent timing mark bursts corrected based on the timing mark position error fed back to the controller.

11. The method of claim 10 further comprising selecting gains to optimize control by the controller without adding excessive measurement noise.

12. The method of claim 1 wherein the timing mark position error is periodic.

13. The method of claim 1 wherein writing the plurality of timing mark bursts comprises writing a first burst and a second burst in each step, the first burst having an intentional misalignment, the second burst having another intentional misalignment.

14. The method of claim 13 wherein the timing mark position error is a difference between the measured burst amplitude of the first burst and the measured burst amplitude of the second burst.

15. The method of claim 1 wherein using the measure burst amplitude to obtain a timing mark position error comprises comparing the measured burst amplitude and an expected burst amplitude computed based on the intentional misalignment between the misaligned burst and the corresponding burst to obtain the timing mark position error.

16. A method for self-servo writing on the disk with correction based on the timing mark position error as recited in claim 1.

17. A disk having a self-servo write pattern written thereon according to the method of claim 16.

18. A rotating disk storage device comprising:
- at least one disk as recited in claim 17;
- a head configured to read from and write to the at least one disk; and
- an actuator connected to the head to move the head relative to the at least one disk.

19. A servo writing apparatus for writing a self-servo write pattern of a disk drive, the apparatus comprising:
- a read/write head configured to read from and write to a disk; and
- a controller having a computer readable storage medium to store a program, the program comprising
  - code for writing a plurality of timing mark bursts over a plurality of steps on a disk, the plurality of timing mark bursts including at least one misaligned burst having an intentional misalignment in a first step with respect to a corresponding burst in a neighboring second step;
  - code for reading the misaligned burst and the corresponding burst at a seam between the first step and the second step to obtain a measured burst amplitude; and
  - code for comparing the measured burst amplitude and an expected burst amplitude computed based on the intentional misalignment between the misaligned burst and the corresponding burst to obtain a timing mark position error.

20. The apparatus of claim 19 wherein the code for writing the plurality of timing mark bursts comprises code for writing three consecutive timing mark bursts including a first burst, a second burst next to the first burst, and a third burst next to the second burst in each step, the first burst having an intentional misalignment, the second burst having no intentional misalignment, and the third burst having another intentional misalignment.

21. The apparatus of claim 20 wherein the timing mark position error is a difference between the measured burst amplitude of the first burst and the measured burst amplitude of the third burst.

22. The apparatus of claim 21 wherein the timing mark position error is the difference between the measured burst amplitude of the first burst and the measured burst amplitude of the third burst, normalized by the measured burst amplitude of the second burst.

23. The apparatus of claim 20 wherein the intentional misalignment of the first burst and the intentional misalignment of the third burst are opposite in sign and approximately equal in magnitude.

24. The apparatus of claim 23 wherein the intentional misalignment of the first burst comprises a phase shift of about +90° and the intentional misalignment of the third burst comprises a phase shift of about −90°.

25. The apparatus of claim 19 wherein the code for reading the misaligned burst and the corresponding burst at a seam between the first step and the second step comprises code for positioning a read element of the read/write head to be approximately centered with respect to the first step and the second step.

26. The apparatus of claim 19 wherein the program further comprises code for forming an array of depth equal to a read-to-write offset for tracking the timing mark position error at modulo the read-to-write offset.

27. The apparatus of claim 26 wherein the program further comprises code for feeding back a portion of the timing mark position error to control a write delay of the write head at each step according to the step's position within the array.

28. The apparatus of claim 27 wherein the program further comprises code for writing subsequent timing mark bursts corrected based on the timing mark position error.

29. The apparatus of claim 28 wherein the program further comprises code for selecting gains to optimize control by the controller without adding excessive measurement noise.

30. The apparatus of claim 19 wherein the timing mark position error is periodic.

* * * * *